United States Patent [19]
Lamberson

[11] 3,800,437
[45] Apr. 2, 1974

[54] EDUCATIONAL APPARATUS

[76] Inventor: Jack L. Lamberson, P.O. Box 482, Foxboro, Mass. 02035

[22] Filed: Dec. 1, 1972

[21] Appl. No.: 311,347

[52] U.S. Cl. ................................................. 35/9 B
[51] Int. Cl. ............................................. G09b 7/06
[58] Field of Search ...................... 35/9 B, 9 C, 9 D; 200/166 PC, 86 R, 86 A

[56] References Cited
UNITED STATES PATENTS

| | | |
|---|---|---|
| 2,997,793 | 8/1961 | Kelly ...................................... 35/9 D |
| 3,579,857 | 5/1971 | Lamberson ........................... 35/9 B |

*Primary Examiner*—Wm. H. Grieb
*Attorney, Agent, or Firm*—Pravel, Wilson & Matthews

[57] ABSTRACT

Various educational apparatus utilizing teaching sheets or film for providing a positive reward signal in response to depression of the correct symbol or a teaching sheet or depression of a switch corresponding to the correct, projection symbol. In one embodiment of this invention, a musical educational device is provided to produce tones corresponding to musical symbols on a teaching sheet.

8 Claims, 13 Drawing Figures

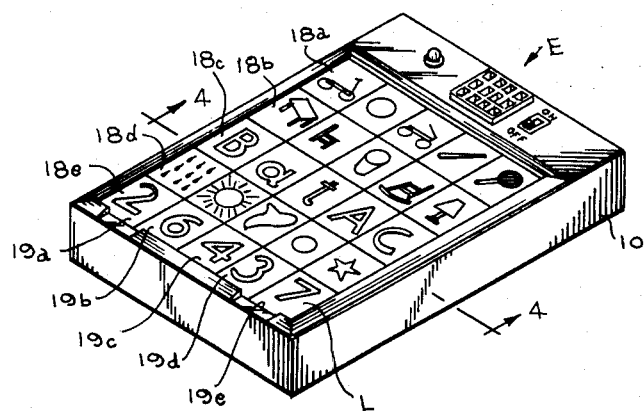
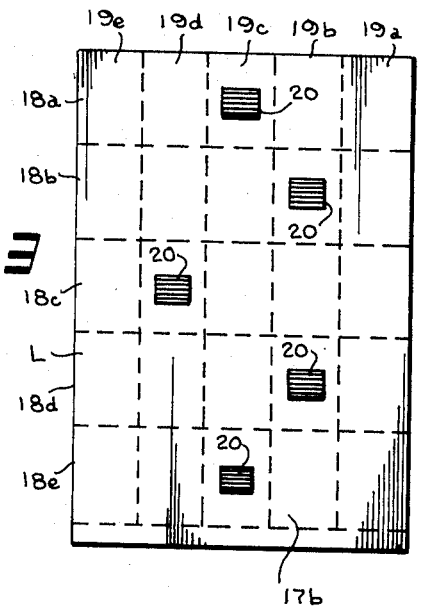
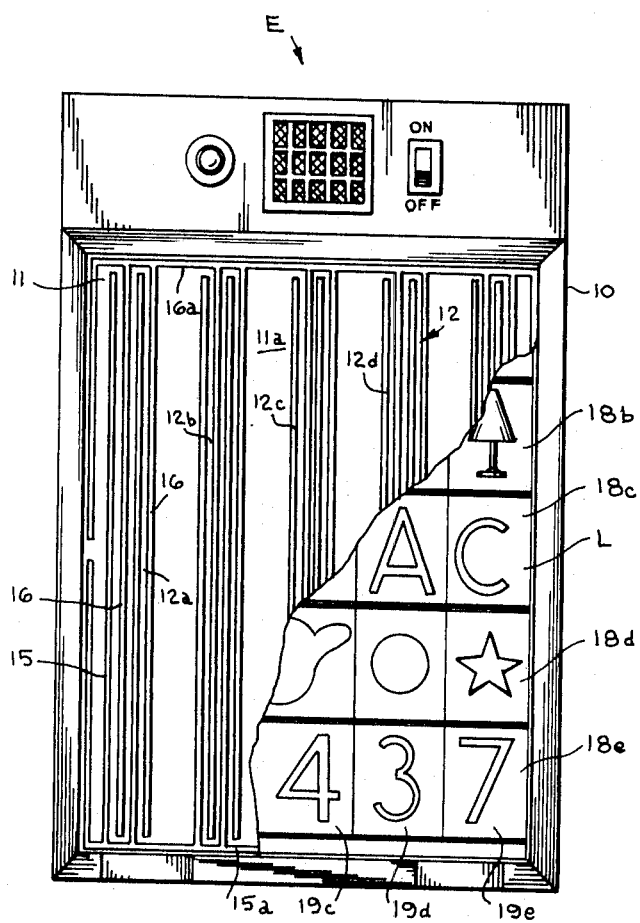

PATENTED APR 2 1974 3,800,437
SHEET 3 OF 4
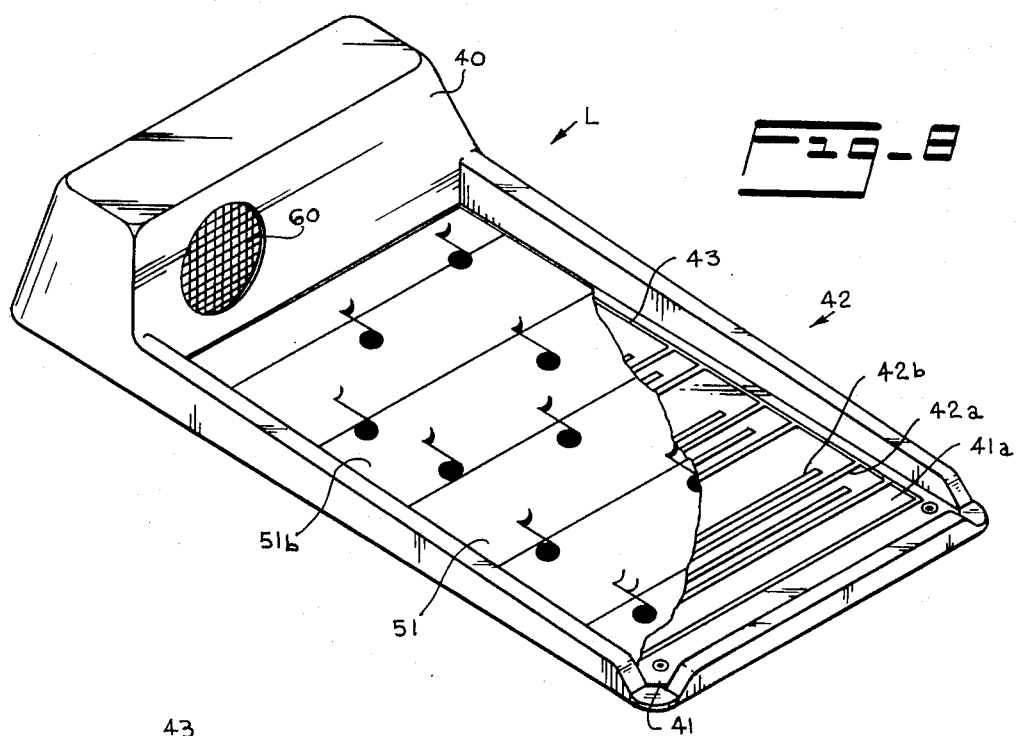
Fig-8
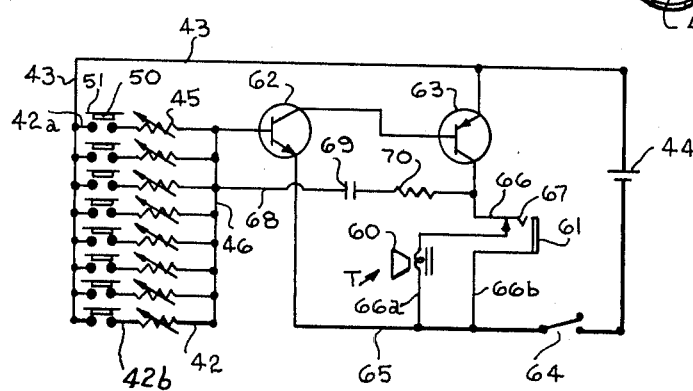
Fig-9
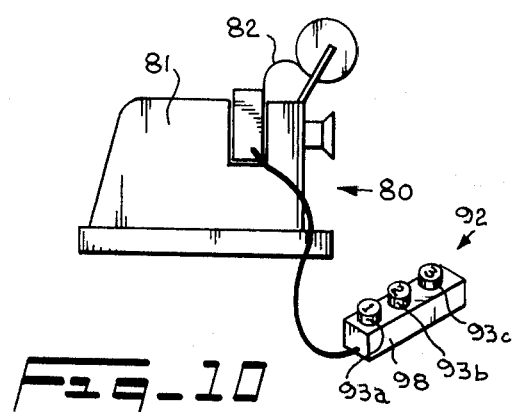
Fig-10
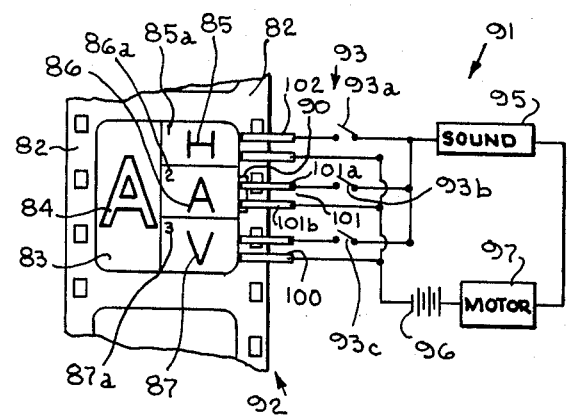
Fig-11

3,800,437

EDUCATIONAL APPARATUS

BACKGROUND OF THE INVENTION

The field of this invention is educational devices.

There is an educational device that is known to provide a positive reinforcing response such as a buzz or a light, or both, upon depression of the correct symbol on a teaching sheet. The U.S. Pat. No. 3,579,857, issued to this same inventor, Lamberson, disclosed an electric teaching device wherein a resilient sheet having openings therein was positioned between a selected teaching sheet and a network of grid conductors connected to a signal producing circuit. The teaching sheet had a connector bridge attached on the underside under the correct symbol and the user was required to depress the teaching sheet sufficiently hard to push the conductor bridge through the opening in the selected sheet into electrical engagement with the network of grid conductors.

SUMMARY OF THE INVENTION

It is the object of this invention to provide new and improved positive response educational devices which provide a positive response such as a sound signal in response to a student choosing the correct aswer. Such a positive response educational device includes a case cooperating with a support panel to receive a learning sheet. First and second electrical conductors are mounted in a spaced relationship on the support panel and an electrical connector is mounted onto the underside of the learning sheet in position to electrically engage and connect the spaced conductors upon depression of the learning sheet in that area. An electrical signal circuit is electrically connected with the spaced conductors to provide a positive signal such as a buzzer, alarm and/or visual signal in response to completion of the electrical circuit by the electrical connector attached to the learning sheet. The first and second conductors mounted onto the support panel are of different thicknesses in order to prevent accidental completion of the electric signal circuit. However, utilizing the educational device of the preferred embodiment of this invention, very little pressure is required to depress the learning sheet and push the electrical connector mounted thereunder into electrical connection with the spaced grid conductors of the electric signal circuits.

In another embodiment of the educational device of this invention, a casing is provided with a support panel with a plurality of openings therein; and, push buttons are mounted in the panel openings and are mechanically connected to a signaling device such that, upon depression of a teaching sheet over one of the push buttons, the signal device is mechanically actuated. The teaching sheet for this mechanical version of the educational device has a plurality of discs mounted on the underside of the teaching sheet in alignment with the panel openings in the casing. A portion of the discs are rigid to prevent depression of the teaching sheet against the push button mounted in the panel opening; however, another portion of the discs are flexible to allow depression of the teaching sheet and the push buttons to activate the signal device. Of course, the flexible discs are mounted underneath the symbols positioned on the upper surface of the teaching sheet, which symbols denote the correct answers.

It is another object of this invention to provide a musically responsive educational device for teaching children or others music. Such a musical responsive educational device includes a support panel mounted with a case such that a musical learning sheet may be fitted over the support panel. A plurality of conductor sets are mounted onto the support panel and are in electrical engagement with a musically responsive electric circuit, whereby, upon the making of electrical connection between the sets of conductors, various tones are produced by the electric circuits. The musical learning sheet is a flexible material having musical notes on the upper surface thereof and electrical connectors mounted on the underside thereof directly underenath the musical notes whereby depression of the learning sheet at a musical note will cause a corresponding tone to be produced by the electric circuit.

It is a further object of this invention to provide new and improved apparatus for providing a positive response to the correct choice of an answer to a problem visually projected onto a screen or other suitable means.

BRIEF DESCRIPTION OF THE DRAWINGS

FIG. 1 is an isometric view of the positive response educational device of a preferred embodiment of this invention;

FIG. 2 is a top view partly in section of the educational device of FIG. 1;

FIG. 3 is a bottom view of the teaching sheet utilized by the apparatus of FIGS. 1 and 2;

FIG. 8 is an isometric view of the musically responsive educational device of another embodiment of this invention;

FIG. 9 is a schematic view of the electrical tone circuit utilized in the musical device of FIG. 8;

FIG. 10 is an elevational, partly schematic view of the film projection educational device of another embodiment of this invention;

FIG. 11 is a schematic view of the electrical circuit and film strip utilized in the film projection educational device of FIG. 10;

DESCRIPTION OF THE PREFERRED EMBODIMENT

Figure 4:
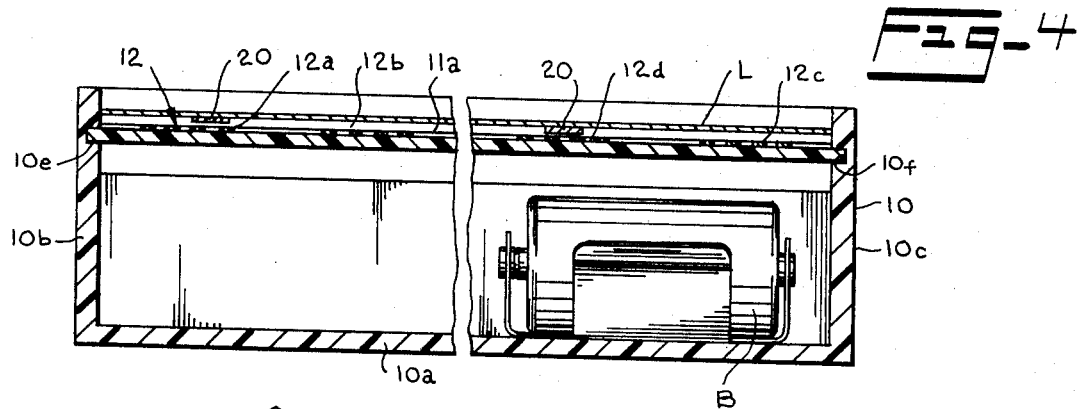
FIG. 4 is a sectional view taken along lines 4—4 of FIG. 1.
Figure 5:
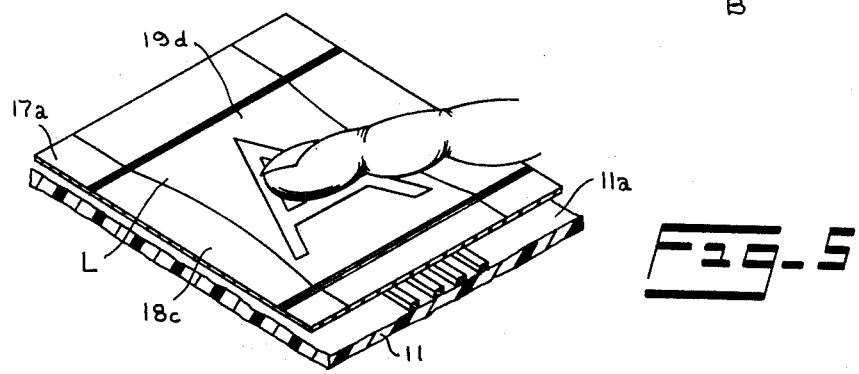
FIG. 5 is a fragmentary view in perspective of the relative position of the various components of the educational device of FIG. 1.

Referring to FIGS. 1–7 of the drawings, an educational apparatus E is illustrated for providing a positive response such as an auditory signal or a flashing light in response to the choosing of the correct answer on learning sheet L. The educational apparatus E includes a basically rectangular case 10 of plastic or other suitable material. The case 10 includes bottom 10a and side walls 10b and 10c. A horizontal groove 10e is formed on the inside of case wall 10b and a corresponding groove 10f is formed on the inside of case wall 10c. These grooves 10e and 10f cooperate to receive a support panel 11. The support panel 11 may be made of any rigid synthetic material such as polymeric material and mounts within the case wall grooves 10e and 10f.

Figure 7:
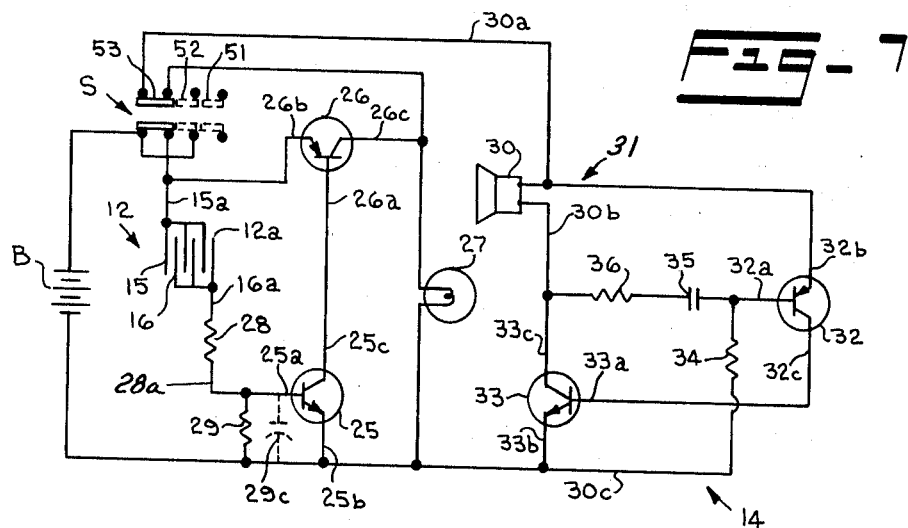
FIG. 7 is a schematic view of the electric signal circuit utilized in the apparatus of FIG. 1.

A grid network generally designated as 12 is mounted onto upper support panel surface 11a and is in electrical connection with electric signal circuit means generally designated as 14, which is illustrated in FIG. 7 and will be described in more detail hereinafter. The grid network 12 includes 5 grid sets 12a, 12b, 12c, 12d and 12e, each grid set being electrically connected to the electric signal circuit means 14. Each grid set includes first grid conductor lines 15 that are spaced adjacently to second grid conductor lines 16. The first grid conductor lines 15 are electrically connected with a common grid line 15a. Each of the second grid conductor lines 16 are electrically connected with a common conductor line 16a. The common conductor lines 15a and 16a form part of the electric signal circuit means 14 to be described in detail hereinafter. For the moment it will be sufficient to say that the providing of an electrical connection between a first grid conductor line 15 and a second grid conductor line 16 will provide for completion of the electric signal circuit 14 which emits a positive auditory or visual response upon completion.

The grid conductor lines 15 and 16 may be copper elements which are laminated to the upper surface 11a of the support panel 11. Or, the grid conductor lines may be a foil such as an aluminum foil which is printed onto the support panel 11 by any suitable means. Further, the aluminum foil may be laminated by suitable means to a support panel made of latex rubber impregnated board. It should be understood that it is within the scope of this invention to use any type of grid conductor lines to provide the first grid conductor lines 15, the second grid conductor lines 16 and the common grid conductor lines 15a and 16a.

The learning sheet L is made of a flexible, synthetic material and is of such size that it may be placed between case wall 10b and 10c onto the grid network 12 attached to the support panel 11. Upper learning sheet surface 17a and lower learning sheet surface 17b are divided into corresponding rows and columns. Referring to the learning sheet L as divided into rows 18a, 18b, 18c, 18d and 18e. The learning sheet L is further divided into columns 19a, 19b, 19c, 19d and 19e.

Each row, such as 18c, includes a plurality of symbols in columns 19a through 19e in that row. In the preferred embodiment of this invention, the symbol "B" in row 18c, column 19a is the "question" symbol which determines which of the other symbols in row 18c is the correct answer. For example, in row 18c, it is desirable to identify which of the symbols 19b through 19e is similar to the symbol B. Of course, the answer is "A" in column 19d in the row 18c. And, the student or other user of the educational device E will depress the learning sheet L at the symbol A as the correct answer. In order to provide a response to the A being properly chosen, the electrical signal circuit 14 must be completed.

In order to complete the electrical signal circuit 14 upon depression of the correct answer A, an electrical connector element 20 is mounted onto underside 17b of the learning sheet L directly underneath or in alignment with the A. The electrical connector 20 is of sufficient size such that, upon depression, the electrical connector will engage electrically adjacently positioned first or second grid conductor lines 15 and 16 in the grid set 12d thereby causing completion of the electric signal circuit means and a responsive signal which will be described hereinafter.

In a similar manner the correct answer for each of the other rows, 18a, 18b, 18d and 18e have electrical connectors 20 mounted on the underside 17b of the learning sheet L. And, for each row, whenever the correct answer symbol is depressed on the learning sheet L, an electrical connector 20 mounted thereunder will complete electrical connection between first and second adjacently disposed grid connector lines 15 and 16 in that particular grid set thereby causing completion of the electric signal circuit means and an auditory and/or visual response.

The electrical connector 20 may be a metal conductor chip adhesively secured to underside 17a of the learning sheet L. Or, the connector 20 may be provided by some type of conductive ink such as silk screen conductive ink or letter press ink. It is within the scope of this invention to utilize any type of conductive material which will electrically connect adjacently disposed grid conductor lines upon depression of the learning sheet directly over the conductor element 20.

The normal position of the learning sheet L is such that the connector elements 20 are slightly out of electrical contact with first and second grid conductor lines 15 and 16 so that the electrical signal circuit means is not activated. And, whenever a student depresses, even slightly, the learning sheet L over the proper answer, an electrical connector element 20 is pressed into electrical engagement with adjacent lines 15 and 16 to complete the electric signal circuit 14.

Figure 6:
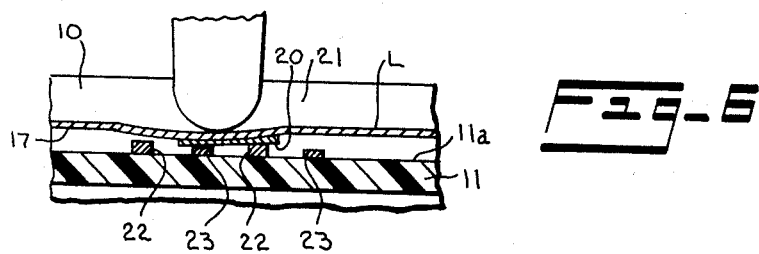
FIG. 6 is a partially sectional view of the actuation components of the apparatus of FIG. 1 in an actuated position.

In the embodiment illustrated in FIG. 6, an alternate embodiment for the grid sets is designated by the number 21. In the grid set 21, the first grid conductor lines 22 are electrically attached to a common grid conductor line such as 15a and the second grid conductor lines 23 are electrically attached with the other common conductor line 16a. Of course, the grid conductor lines are mounted onto the upper surface 11a of a support panel such as the panel 11. However, in the embodiment of FIG. 6, the thickness of the second grid conductor lines 23 is less than the thickness of the first grid codductor lines 22. In this manner, the electrical connector 20 mounted onto underside 17b of the learning sheet L tends to rest upon the first grid conductor lines 22 of greater thickness, thus insuring that there is not electrical connection between the adjacently spaced first and second grid conductor lines 22 and 23 prior to depression of the learning sheet L over the electric connector 20. However, upon depression, electrical contact is easily made by pressing the electrical connector downwardly and perhaps slightly twisting same until engagement is made with both first and second grid conductor lines 22 and 23.

The electrical signal circuit means 14 has been described as providing an auditory and/or visual signal in response to depression of an electrical connector 20 into engagement with first and second adjacently spaced grid conductor lines 15 and 16. Referring to FIG. 7, the electric signal circuit means 14 includes a battery power source B which is connected to a switch S to the base 25a of a transistor 25. The battery is also connected through the switch S to the emitter 26b of a second transistor 26. The second transistor 26 is connected through its base 26a to the collector 25c of the first transistor. A light source or lamp 27 is electrically connected to the collector 26c of transistor 27 and to the emitter 25b of the first transistor 25.

The switch S is movable between three positions. In FIG. 7, the first position is designated as S1 and is only shown schematically. In the position S1, the electric signal circuit means 14 is off. Switch position S2 is also shown schematically and provides a light signal from lamp 27 in response to completion of the circuit. Finally, switch position designated as S3 provides for both the visual response of the lamp 27 and for an auditory response from speaker 30 in response to completion of the circuit.

When the switch S is in the light only position designated S2, the circuit operates in the following manner. Whenever a electrical connector 20 is depressed with a symbol on the learning sheet L, the circuit between grid conductor lines 15 and 16 in a grid set such as 12a is completed, such that electrical connection is provided between common grid lines 15a and 16a. Voltage is thus provided through the switch S in the position at S2 from the battery B to the emitter 26b of transistor 26 and to the base 25a of transistor 25. Resistor 28 is positioned in conduction line 16a to function as a current limiting resistor; and, a bias resistor 29 is connected between transistor base 25a and transistor emitter 25b.

When electrical connection is made between grid conductor lines 15 and 16 in a grid set such as 12a, the battery B provides current to the base 25a of transistor 25 thereby turning transistor 25 on. The turning of transistor 25 on serves to reduce the voltage at transistor base 26a thereby turning on transistor 26a, which conducts current to the lamp 27. Thus, with the switch S in the position S2, the lamp 27 is turned on by completion of electrical connection by a connector 20 between grid conductor lines 15 and 16. Of course, when the student lifts his finger from the learning sheet L, the connector 20 moves out of engagement with both of the grid conductor lines 15 and 16 thereby opening the circuit connection between common lines 15a and 16a. The opening thereof the circuit causes a turning off of both transistors 25 and 26.

When the switch S is in the position shown as S3, a completion of electrical connection between grid lines 15 and 16 causes the lamp to turn on as heretofore described. In addition, the conducting of current by transistor 26 causes a passage of current into line 30a to an auditory circuit generally designated as 31. In the auditory circuit 31, the speaker 30 is connected to line 30a and to emitter 32b of transistor 32. The collector 32c of transistor 32 is connected to base 33a of another transistor 33. Resistor 34 is electrically connected between transistor base 32a and the emitter 33b of the transistor 33. A capacitor 35 and a resistor 36 are connected between base 32a of transistor 32 and the collector 33c of transistor 33, and also to the speaker 30 by line 30b.

The application of power through connecting line 30a causes the charging of capacitor 35 through line 30c. The charging of capacitor 35 turns on transistor 32 slightly, which turns on transistor 33 fully. The passage of current to emitter 33b-collector 33c of transistor 33 causes current to pass through the speaker 30. The capacitor 35 begins to lose its charge and shuts off transistor 32 thereby shutting off transistor 33. Then, the cycle begins again and the capacitor 35 is again charged to a level to turn on the transistors 32 and 33 and the cycle is repeated. This causes an oscillating speaker sound or buzz in response to the completion of the circuit between grid conductor lines 15 and 16. Thus, whenever the switch S is in the position S3, both a visual signal through lamp 27 and an oscillating auditory signal through speakers 30 are provided as a positive response to the student choosing the correct symbol.

An additional capacitor means may be provided to prevent activation of the lamp 27 or speaker 30 in response to some accidental or inadvertent depression of the learning sheet L. A capacitor 29c is illustrated schematically as in connection between transistor base 25a and emitter 25b. If the learning sheet is accidentally depressed, it is likely that the depression is quite instantaneous. For example, a student might accidentally quietly brush a finger over the sheet L. If so, the capacitor 29c will receive any current which flows through line 28a thereby preventing a biasing of the transistor 25. Since the charging in capacitor 29c is very brief, it will not attain sufficient charge to turn on transistor 25. Of course, if the student presses the sheet L purposely, the grid connection will remain connected for sufficient time to charge capacitor 29c and obtain a voltage drop across resistor 29 sufficient to turn on transistor 25.

The second embodiment of the present invention is adapted for use as a musical responsive educational device and is illustrated in FIGS. 8 and 9. This embodiment of the educational apparatus includes a suitable housing or case 40 which is preferably formed of a plastic material produced by injection molding or any other suitable molding technique. The case 40 includes a support panel or base 41 attached or mounted with the case 40 and having a substantially flat upper surface 41a. Mounted on the surface 41a is a network or plurality of sets of grid conductors 42. While only two sets of grid conductors are partially illustrated in FIG. 8 for the purpose of understanding the present invention, it will be readily apparent to those skilled in the art to employ eight sets of grid conductors in the network 42 to provide a full range of musical tones. Each of the plurality of sets of grid conductors 42 includes a first grid conductor line 42a and a second grid conductor line 42b that are located adjacent to each other and extend across the surface 41a in parallel spaced rows.

As illustrated in FIG. 9, the plurality of first grid conductor lines 42a are electrically connected with a common grid line 43 which is electrically connected to a source of electrical power, such as, but not limited to, a battery 44. Each of the plurality of grid conductors 42b is electrically connected in series with an appropriately selected adjustable variable electrical resistor 45 which is preferably selected in a range of 1 megohm to 25 kilohms for the circuit. The resistance of the other resistors 45 is then selected or set to divide this range of resistance into equal parts or steps for providing equal steps of resistance within this range. The electrical output of the variable resistors 45 is then electrically connected to a common conductor 46. It will be immediately appreciated to those skilled in the art that the three rows of the plurality of grid connectors as illustrated in FIG. 8, may be connected in parallel in order that any number of rows having a plurality of sets of grid conductors 42 may be used with the present invention. Again, it should be understood that it is within the scope of this invention to use any type of grid conductor lines to provide the first grid conductor lines 42a, the second grid conductor line 42b and the common grid conductor lines 43 and 46.

The learning sheet L is made of the flexible, synthetic material and is sized to fit on the upper surface 41a to position a plurality of electrical connector elements 50 mounted on a lower surface 51a of a musical learning sheet 51 in a manner similar to the electrical connector element 20 is mounted to the underside 17b of the learning sheet L. The musical learning sheet 51 includes an upper surface 51b having a plurality of preferred musical symbols arranged thereon in a plurality of rows. The electrical conductor elements 50 are mounted with the learning sheet 51 directly below the musical notes located on the upper side of the musical learning sheet 51. By depressing the sheets 51 at a musical note, the electrical connector element 50 will effect electrical connection between a first grid conductor line 42a and a second grid conductor line 42b which are positioned in each row to achieve the desired electrical continuity to produce a sound corresponding to its relative position in the row by completing the circuit through the desired resistor.

As illustrated in FIG. 9, a musical responsive electrical circuit means is electrically located in the case 40 and is connected with the connector 43 and the output connector 46. The musically responsive electric circuit means includes a tone means T for providing a musical tone in response to an electrical signal conducted to the tone means T and which may include either or both a speaker means 60 or a headphone set means 61. The musically responsive electrical circuit further includes a first transistor means 62 and a second transistor means 63. The first transistor means is electrically connected with the common conductor 46 and the plurality of grids 42 arranged in parallel electrical connection therewith. The transistor means 62 is also electrically connected with the second transistor means 63 and through a circuit or system on-off switch 64 with the source of power 44 and the common conductor 43 by a conductor 65. The second transistor means 63 is electrically connected to the conductor 65 by conductor 66 having a parallel branch 66a connected to the speaker 60 and parallel branch 66b connected with the headphone set 61. An electrical switch, designated at 67, may be incorporated to electrically isolate the conductor 66b when desired. The common conductor 46 and the conductor 66 are electrically connected by a conductor 68 having a capacitor 69 and a fixed value resistor 70 electrically connected therein.

Normally, there is no electrical continuity between the conductor 43 and the conductor 65 with the switch 64 closed to establish the circuit as the transistor means 62 and 63 block passage of electrical signals therebetween and there is no continuity between the spaced grid conductor lines 42a and 42b. By depressing the learning sheet 51 at the proper musical symbols, continuity through a desired set of grid conductors 42 and resistor 45 is established and a desired electrical signal is established in the common conductor. The closing of a grid connector set 42 will commence to electrically charge the capacitor 69 until the voltage at the base of the transistor means 62 is sufficient to operate or switch on transistor means 63 to conduct an electrical signal from the common conductor 43 through the conductor 66 and the speaker means 60 to the conductor 65. This current flow or electrical signal continues until the charge in the capacitor 69 is sufficiently reduced by the operation of the speaker means 60 which then turns off the first transistor means 62 and which in turn turns off the second transistor means 63 for blocking passage of electrical signals through the conductor 66. When that occurs, the capacitor 69 again commences to electrically charge for repeating the sequence of switching for establishing the current flow through the speaker means 60. As the rate of charging of the capacitor 69 is controlled by the size of the resistor 70 and the variable resistor 45, the frequency of the electrical signal through the speaker means 60 is controlled to provide different musical tones in response to the electrical connectors 50 making electrical connection between first grid conductor lines 42a and second grid connector lines 42b of the different adjustable variable resistors 45. Thus, as the user depresses the musical notes on the sheet 51, he will achieve a positive response of playing the musical tune on the sheet 51. As is well known, if electrical contact is established at a first set of conductors and a second set of conductors simultaneously and current flow is through two or more resistors 45, a different or third resistance level will be achieved between the common conductors 43 and 46 and an altogether different tone resulting from a different frequency established by the circuit, will be produced.

A third embodiment of the present invention is illustrated in FIGS. 10 and 11 and includes a film projection educational device 80. While a film strip slide projector embodiment 81 is illustrated in FIG. 10, it is readily apparent that a movie film projector apparatus will be equally suitable for use with the present invention. The film projection educational device 80 includes the film projector 81 and a film 82 for mounting in the film projector 81 for projecting the teaching symbols on the film 82 with the projector 81 on a suitable screen or other display device visible to the user or users of the device. The reel or catridge of slide projector film illustrated in FIG. 10 is projected on the viewing screen by positioning the film strip in alignment with the lamp and lens of the projector 81 as is well known in the art. Each of a plurality of frames in the film strip 82 is arranged in the form of a multiple choice educational arrangement format. As illustrated in FIG. 11, the frame 83 includes a question symbol 84 preferably positioned on half of the frame 83 and a plurality of multiple choice answers 85, 86 and 87 positioned on the other half of the frame 83. Each of the answers, 85, 86 and 87, is assigned an identifying number, 85a, 86a and 87a, respectively, which is common to the system for actuating the answering mechanism.

Located on the film strip 82 adjacent the proper answer is an electrical conductive strip 90. The strip 90 is located adjacent the correct answer for completing the circuit when the proper answer switch is operated as will be set forth in greater detail hereinafter. In the frame 83 illustrated in FIG. 11, the proper answer to the question symbol 84 is the answer symbol 86 which corresponds to answer identification No. 2, designated 86a. The conductor strip 90 may be a flexible metal strip or may be conductive ink as set forth hereinabove.

The film projector educational device 80 further includes an electrical circuit means 91 having a first switch means 92 and a second switch means 93. The electrical circuit means 91 provides an electrical signal upon the closing of both the first and second switch means to provide a suitable visual or auditory signal such as provided by the sound means designated at 95. The circuit means 91 further includes a power source designated at 96 and may provide an automatic motor means designated at 97 for advancing the slide frame 83 upon the user making the correct response.

The second switch means 93 includes a plurality of switches 93a, 93b, and 93c which are preferably located in a housing 98 remote from the projector 81. The user selects the proper response to the question symbol 84 by depressing switch buttons 93a, 93b or 93c corresponding to the proper answer identification number to close respective circuits for eliciting the positive response if the correct answer is selected.

The first switch means 92 includes a plurality of pairs of spaced apart conductor elements 100, 101 and 102 corresponding to the location of the answer symbols, 85, 86 and 87 on the frame 83. Each of the plurality of pairs of first switch means 92 including a pair of spaced conductors such as illustrated at 101a and 101b, which are aligned with the film strip 82 and the correct answer conductor element 90 mounted with the film for electrically connecting the conductors 101a and 101b when the film is positioned in the projector 81 for viewing. Thus, the first switch means 92 is closed by the connector element 90 which provides a switch closing means for the proper answer only and which leaves open the first switch means for the incorrect answer in order to prevent electrical closing of the circuit when an incorrect answer is selected. Of course, by properly positioning the connection switch or element 90, the proper response may be located at any of the answer locations 85, 86 or 87 of the frame 83.

By the use of the motor means 97, the film strip 82 will be advanced to the next frame automatically upon closing of the first and second switch means. Those skilled in the art may vary the electrical circuit means illustrated in FIG. 11 to enable individual sound response, for example, through head sets, by a plurality of users during each frame projection without departing from the scope of the present invention.

Figure 13:
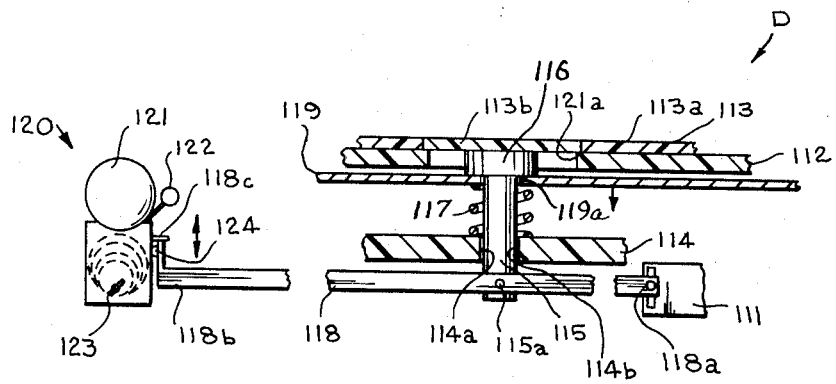
FIG. 13 is a sectional view, partly in schematic, of the mechanical actuator mechanism utilized in the device of FIG. 12.
Figure 12:
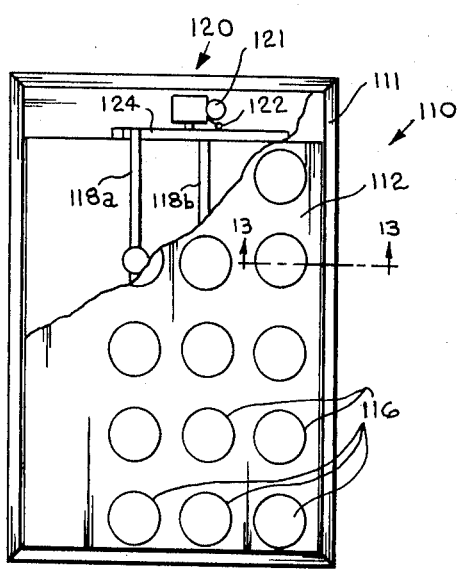
FIG. 12 is a top view of a mechanical version of the positive response educational device of this invention.

A fourth embodiment of the present invention designated 110, is illustrated in FIGS. 12 and 13 and which employs a mechanical depressor actuator means for eliciting positive response from the educational apparatus E. The educational device 110 includes a casing or housing 111 having a support panel 112 forming a substantially flat planar surface for positioning a teaching sheet or mat 113 thereon. Spaced below the support panel 112 and substantially parallel thereto is a brace member or panel 114 which is mounted with the casing 111. The support panel 112 and the bracing member or panel 114 having a plurality of openings 121a and 114a, respectively, extending therethrough in substantially aligned registry. Positioned in each pair of the plurality of aligned openings 121a and 114a is a depressor actuator means D including a depressor stem 115 mounting an enlarged button or head which is normally positioned within the opening 121a of the support panel 112. The button 116 is normally held in this upper position by a biasing spring 117 which is supported on the bracing panel 114 in concentric relationship with the stem 115 to engage the lower portion of the button head 116. The lower end of the stem 115 extends through the opening 114a to a pivotal connection with horizontal extending lever arm 118 at 115a. The lever arm 118 is pivotally connected to the casing 111 at a first end 118a so that the user by depressing the button head 116 will effect downward movement of a second end 118b of the lever arm 118 from the position illustrated in FIG. 13. Preferably, a resiliently flexible guide panel, 119, is positioned between the support panel 112 and the brace panel 114 and which has a plurality of openings 119a therethrough aligned with the openings 114a and 121a and dimensioned to enable passage therethrough of the stem 115, but not the button head 116. The guide panel 119 serves to insure that when the biasing spring 117 automatically returns the depressor stem 115 upwardly to the normal position, when the user releases or ceases depressing the button head 116, the button head 116 will be located in the corresponding opening 121a for subsequent actuation.

The educational device 110 further includes an auditory signal means 120 mounted with the casing 111 for providing a positive response signal when actuated. The auditory signal means 120 includes a sounding bell 121 for producing an audible sound when struck by the hammber 122. The signal means 120 further includes a wind-up spring motor means 123 for operating the hammer 122 to strike the gong 121 when actuated. The spring driven motor means 123 includes a pall means 124 for holding the motor means 123 in an inoperative position until the pall means 124 is actuated or released. As illustrated in FIG. 12, the pall means 124 includes a bar extending across the three answer columns of the device 110 and which is depressed for actuation of the motor means 123 by downward movement of the end 118b of the lever arm 118 engaging with the catch 118c mounted on the end 118b of the lever arm. Thus, by depressing any one of a plurality of button heads 116, mounted in the plurality of openings 121a in the support panel 112, the hammer 122 will be caused to strike the gong 121 for emitting a positive response auditory signal.

Teaching sheet or panel 113 includes a plurality of symbols on an upper surface 113a which preferably is arranged in rows and columns in a manner like that previously disclosed. The teaching sheet 113 includes a plurality of discs mounted therewith at the symbols and with the size of the discs 113b being greater than the size of the openings 121a in the support 112 when in proper registery therewith. The discs mounting the proper responsive answer symbol being sufficiently flexible to enable depression of said disc 113b and sheet 113 at the proper symbol to enable depession of the button head 116 by the user to achieve the proper positive response from the bell 121. The disc adjacent incorrect responses are made substantially rigid to prevent the depression of the button head 116 and thus the actuation of the signal device 120 when the user makes an incorrect response. When the correct answer is selected and the disc depressed to move the lever arm 118, a positive response is obtained. The spring 117 automatically returns the depressor stem 115 in the button head 116 to the normal position illustrated when the user ceases depression of the button head 116.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit of the invention.

I claim:

1. A positively responsive educational device, comprising:

a case;

a support panel mounted with said case, said case and support panel cooperating to receive a learning sheet;

first and second electrical conductors mounted in spaced relationship on said support panel, said first conductor being thicker than said second conductor;

electrical signal circuit means mounted with said casing and electrically connected to said first and second spaced conductors for producing a signal in response to electrical connection of said first and second spaced conductors; and said learning sheet being a flexible material having teaching symbols on the upper surface thereof and an electrical connector mounted on the underside thereof and positioned to be moved into operative engagement initially with said first conductor and subsequently with said second conductor whereby a signal is provided in response to the depressing of said flexible learning sheet.

2. The structure set forth in claim 1, including:

a plurality of said first and second conductors mounted with said support panel, each of said first conductors being positioned adjacent to a second conductor to form a grid set; and said electrical signal circuit means being electrically connected to each of said first and second conductors in a grid set.

3. The structure set forth in claim 2, including:

said upper surface of said learning sheet having a plurality of teaching symbols in rows, an electrical connector mounted on the underside of said teaching sheet in alignment with a symbol in each row, each of said electrical connectors being positioned to electrically interconnect said first and second conductors of a grid set upon depression of said teaching sheet.

4. The structure set forth in claim 1, wherein said electrical signal circuit means includes:

means for preventing said signal in response to accidental depression of said flexible learning sheet.

5. The structure set forth in claim 3, wherein:

the number of said grid sets is one less than the number of said teaching symbols in a row.

6. The structure set forth in claim 1, wherein said electrical signal circuit means includes:

an oscillating sound signal.

7. The structure set forth in claim 1, wherein:

said electrical connector includes silk screen conductive ink.

8. The structure set forth in claim 1, wherein:

said electrical connector includes letter press conducting ink.

* * * * *